United States Patent
Boertje et al.

[15] 3,696,735
[45] Oct. 10, 1972

[54] APPARATUS FOR FRYING FOOD PIECES

[72] Inventors: Arie Leendert Boertje, Hoogeveen, Netherlands; Peter John Philpott, Felmersham, England

[73] Assignee: Lever Brothers Company, New York, N.Y.

[22] Filed: Nov. 13, 1968

[21] Appl. No.: 776,007

[30] Foreign Application Priority Data

Nov. 13, 1967 Netherlands..............6715386

[52] U.S. Cl. ..........................99/404, 99/330, 193/27
[51] Int. Cl................................................A47j 37/12
[58] Field of Search........99/404, 443, 249, 251, 252, 99/403, 279, 330, 336, 345, 355, 359; 221/191, 210, 255, 256; 193/27; 126/344; 220/6

[56] References Cited

UNITED STATES PATENTS

| | | | |
|---|---|---|---|
| 599,205 | 2/1898 | Vause | 193/27 UX |
| 707,297 | 8/1902 | Brink | 193/27 |
| 848,868 | 4/1907 | Trama | 193/27 UX |
| 951,323 | 3/1910 | Mathewson | 193/27 |
| 997,276 | 7/1911 | Curtis | 193/27 |
| 2,285,931 | 6/1942 | Kruckewitt et al. | 193/27 X |
| 2,790,526 | 4/1957 | Donnelly | 193/27 |
| 2,838,288 | 6/1958 | Stoelting et al. | 99/252 X |
| 3,254,792 | 6/1966 | Danielson et al. | 221/191 X |
| 3,379,294 | 4/1968 | Van Liew | 193/27 X |
| 3,460,660 | 8/1969 | Edens et al. | 193/27 |

FOREIGN PATENTS OR APPLICATIONS

| | | | |
|---|---|---|---|
| 1,113,664 | 9/1961 | Germany | 193/27 |
| 1,133,303 | 7/1962 | Germany | 193/27 |
| 686,701 | 3/1965 | Italy | 193/27 |

Primary Examiner—Walter A. Scheel
Assistant Examiner—Arthur O. Henderson
Attorney—Louis F. Kline, Jr.

[57] ABSTRACT

Food pieces are fried in an apparatus comprising a plurality of downwardly sloping straight channels, so arranged in zig-zag fashion that frying oil along with buoyant pieces of foodstuff transfer from the exit end of each channel in free fall to the inlet end of the succeeding channel, reversing direction at this point and turning over the pieces of foodstuff. The oil flows at shallow depth, and the apparatus has guides at the points of transfer to insure smooth flow of oil with minimum turbulence.

1 Claim, 2 Drawing Figures

PATENTED OCT 10 1972

3,696,735

APPLICANTS:
ARIE LEENDERT BOERTJE AND
PETER JOHN PHILPOTT

BY Melvin N. Kurtz
THEIR ATTORNEY

APPARATUS FOR FRYING FOOD PIECES

The invention relates to an apparatus and process for frying food pieces, in which the food pieces are partly or completely fried in a flowing stream of frying oil at appropriate temperature. The invention is particularly concerned with the frying or pre-frying of products requiring a relatively long frying time, e.g. 2 – 3 minutes, such as slices or sticks of raw potato and simulated potato stick products which may be obtained by extruding pieces consisting of a mixture of cooked potato and starch into the oil stream, as well as with frying products having a shorter frying time, e.g. 10 – 30 seconds, such as, so called Krupuks, and also with battered products such as battered fish pieces.

In the frying of such food pieces the difficulty is sometimes encountered that the products being carried along by the oil stream do not remain in the same order as that in which they were fed into the oil stream. The result is that the residence time of the products in the oil stream and thus their frying times may vary quite considerably from piece to piece. Consequently only some of the pieces will be fired to the desired degree where others will be overfried or underfired.

The present invention is concerned with this problem and is based on realization that, to obtain a uniform frying time, eddies in the oil stream which would randomly retard some pieces more than others should be minimized.

To this end the present invention provides an apparatus for frying food pieces comprising a plurality of communicating substantially straight channels within which a stream of frying oil can carry the pieces along and thereby fry them, successive channels being progressively lower and each communicating with the next by an arrangement which enables the oil while carrying the pieces to fall freely and smoothly as it passes from one channel to the next.

With this arrangement the occurrence of eddies at the numerous sharp bends which exist in known continuous serpentine channels are minimized.

Preferably successive communicating channels slope downwardly in substantially opposing directions so that in being carried from one channel to the next the food pieces in the oil stream are effectively turned over. This provides a more uniform cooking on both sides of the product.

Preferably the transfer arrangement comprises guides which ensure that in passing from one channel to the next the oil flows along a smooth curve, thereby minimizing the risk of turbulence or eddies being produced.

It will be appreciated that the free fall between one channel and the next should not be excessive otherwise undue increases in velocity of the oil stream would tend to create turbulence, and it will be appreciated also that the various guiding members should not be so close together as to cause any undue restriction to the flow of oil such as to cause "flooded pipe" flow (i.e. the passageway through which the oil passes should always be greater than the cross-section of the oil-stream) and there should be sufficient clearance to allow unrestricted passage of the food pieces.

Normally, the flow of oil along the channels will be by gravity, and the angle of slope of the channels should be chosen to give a suitable flow rate without introducing random eddies of the type which could trap or retard the pieces.

In a preferred embodiment the channels are arranged below each other in a vertical plane. This measure permits a simple construction of apparatus and requires only a small floor area. In such an arrangement it is preferable that each successive channel is hingedly connected to its adjacent channel so enabling the equipment to be readily adjustable. Thus, by adjusting the slope of each channel, the residence time of the food pieces in the apparatus can be finely controlled, coarse adjustment being provided by altering the number of channels.

The invention will be further illustrated with reference to the drawing, showing by way of example a preferred embodiment of the apparatus according to the invention.

Figure 1:
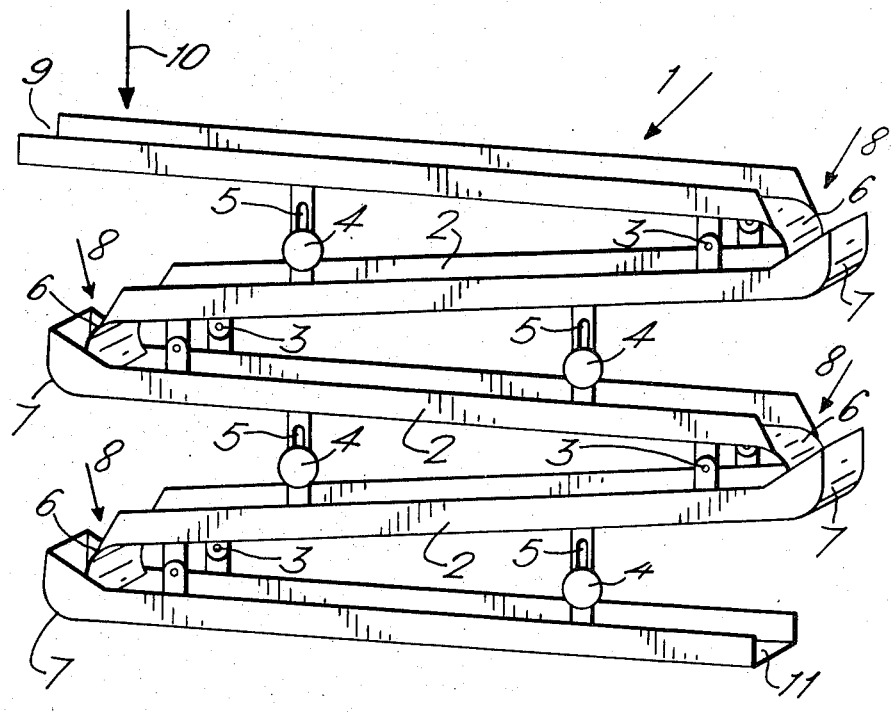
FIG. 1 is a diagrammatic perspective view of the apparatus.
Figure 2:
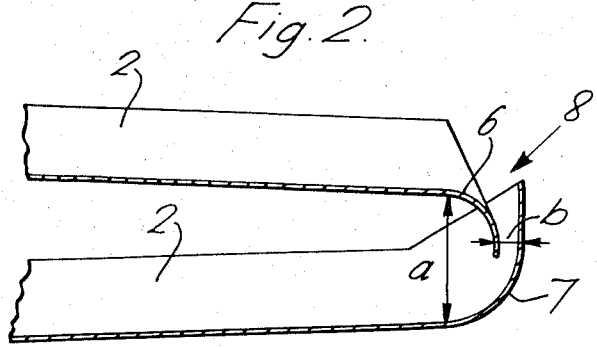
FIG. 2 is a side view of an enlarged scale of a guide between two successive channel sections.

The frying apparatus 1 is built up of a number of channels 2, in the embodiment shown five, in which each channel near its end is hingedly secured to the beginning of the next channel. The hinge point between two successive channels is indicated by reference numeral 3. The mutual distance between two successive channels determining the slope of each channel, can be fixed by means of a set screw 4 attached to one channel, which can be set at any desired point in a guide slot 5, forming part of a preceding channel. Each channel 2 consists of a gutter which is open at the top and has a rectangular cross-section, the bottom plate of which in successive sections carries at its lower end a downwardly bent extension 6, forming part of the curved surface of a cylinder, and at its upper end is bent upwards in such a way that this part forms an end plate 7, closing the open end of the gutter, the curve of which also follows part of the curved surface of a cylinder. The channels 2 are placed in such a way with respect to each other as to form an end section 8 at which the end of a channel with extension 6 opens freely into the end with closing end plate 7 of a subsequent channel and thus enables the oil stream to be passed through to the next channel. In view of the requirement that eddies should be minimized no turbulence must occur in the oil stream after passing an end section 8, the vertical distance $a$ (FIG. 2) between the bottom plates at each end section is kept is kept below a maximum value, which can be established experimentally. The horizontal distance $b$ (FIG. 2) between the extension 6 of a channel and the end plate 7 of the next channel is kept above a minimum value, dependent on the thickness of the oil stream plus the height of that part of the piece of foodstuff if boyant which protrudes above the surface of the oil stream by which it is carried. The requirement concerning the dimension $b$ ensures, in particular, that "flooded pipe" flow cannot take place and that therefore a satisfactory 'free fall' is achieved. The delivery end 11 of the fryer 1 may be connected to an apparatus known per se (not shown) for separating the frying oil and the pieces of foodstuff, or to an apparatus (not shown) for subjecting the products discharged from the fryer 1 to a further treatment.

The working of the apparatus shown is as follows:

Heated frying oil is fed to the apparatus, for which purpose the feed end 9 of the first channel 2 is connected to an oil pipe (not shown), the feeding of the pieces of foodstuff into the oil taking place at the point indicated by reference numeral 10.

The feeding rates of frying oil and pieces of foodstuff are synchronized in such a way that the pieces of foodstuff are carried by the oil stream while being kept separate. Each channel section 2 being placed in an inclined position, the frying oil can continue its way by gravity. Suitably the oil flow rate may be between 4 and 8 gallons per minute per inch width of channel, with an oil depth of from 1 to 1½ inches.

At each end section 8 of two successive channels of the fryer 1 the pieces of foodstuff will be turned over, as on this spot the oil stream makes a free fall, tumbling over substantially 180° to reverse its direction of flow. Both the adjustment of the slope of each channel and the particular construction of the end section 8 ensure that the frying oil flows smoothly and cannot produce excessive turbulence or undesirable eddies at any point in the apparatus. To this end a free fall of not more than 5 inches and preferably 2½ inches is suitable.

The flow of the heated frying oil through the fryer is inevitably accompanied by a drop in temperature of the oil. In order to keep this drop in temperature within permissible limits, the fryer is preferably accommodated in an insulated casing (not shown). Since a drop in temperature of about 10° C. occurring in this case has practically no influence on the frying process, it is not necessary to supply heat to the frying oil during its flow through the apparatus. Water vapor developed in the frying process may be removed from the casing by means of a suction fan. However, only excess water vapor should then be removed from the casing in order to counteract oxidation of the frying oil.

As the slope of the channels 2 may be varied within certain limits, between which turbulence of the oil stream is minimized, the speed of the oil stream, and thus the frying time, can be controlled. The frying time can be further affected by varying the number of channels 2 put into operation. Thus, the apparatus described enables the frying time to be varied over a very wide range and is therefore suitable for use both for products requiring a very short frying time, e.g. 10–30 seconds, and for products requiring a relatively long frying time, e.g. 2–3 minutes.

What is claimed is:

1. Apparatus for frying food pieces comprising:
   i. a plurality of consecutive straight communicating channels suitable for carrying flowing hot oil, each of said channels being inclined in alternately opposing downward direction in a substantially vertical plane, the upper and lower ends of said inclined channels comprising an entrance end and an exit end respectively for the passage of a hot frying oil,
   ii. a plurality of transfer means communicating each channel with the next successive channel, said transfer means comprising guide members to minimize turbulence when said oil flows from one channel to the next, said guide members comprising a downwardly bent extension forming a part of the curved surface of a cylinder at the lower ends of said channels, and an upwardly bent end plate at said upper end of each said consecutive channels also forming a part of the curved surface of a cylinder, and said exit end and said entrance end of consecutive channels being spaced sufficiently apart in vertical relationship to permit a free fall through a distance of about 2½ to 5 inches of any oil flowing through said apparatus.

* * * * *